United States Patent [19]

Svenson

[11] 4,157,146
[45] Jun. 5, 1979

[54] SAFETY CLAMPING SYSTEM FOR PRESSURE VESSEL CLOSURES AND THE LIKE

[76] Inventor: Bert N. Svenson, 9259 Raviller Dr., Downey, Calif. 90240

[21] Appl. No.: 945,089

[22] Filed: Sep. 25, 1978

[51] Int. Cl.² .......................................... B65D 45/16
[52] U.S. Cl. .................................. 220/324; 292/111; 292/257
[58] Field of Search ...................... 220/324, 316, 318; 292/65, 111, 257; 105/377

[56] References Cited

U.S. PATENT DOCUMENTS

| | | | |
|---|---|---|---|
| 3,292,812 | 12/1966 | Svenson | 220/324 |
| 3,441,166 | 4/1969 | De Frees | 220/324 |
| 3,514,009 | 5/1970 | Emery et al. | 220/324 |

Primary Examiner—George T. Hall
Attorney, Agent, or Firm—Charlton M. Lewis

[57] ABSTRACT

Individual clamping structures are described which require only two main members, a pivoted handle member and a clamping member journaled on an integral boss on the handle member. Several types of cam structure are described for positively breaking the pressure seal of a closure during relieving movement of the clamp, thereby insuring the release of any residual pressure while the clamp is still limiting closure movement. A further aspect of the invention directs escape of pressurized gas away from the operator by arranging multiple clamping devices so that clamps near the operator remain closed until all other clamps have been relieved. An opening is thereby provided for blast release on the side of the closure opposite to the operator. The clamps of the invention can secure closures for vessels exposed to external as well as internal pressure, can be symmetrical in the axial direction, are well adapted for power operation and for coupled operation of several clamps, and can readily accommodate an air slide for unloading granular material without closure release.

41 Claims, 43 Drawing Figures

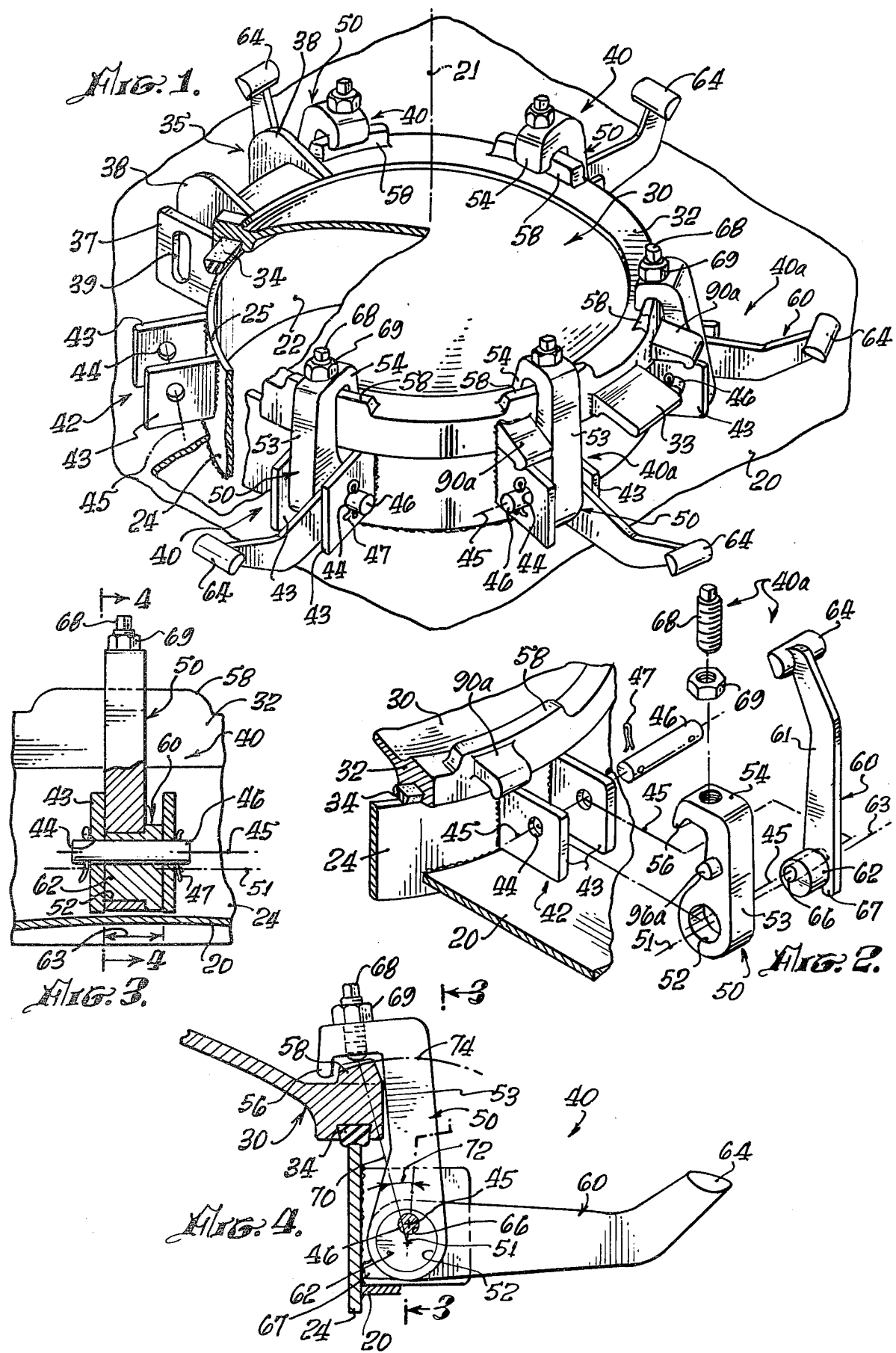

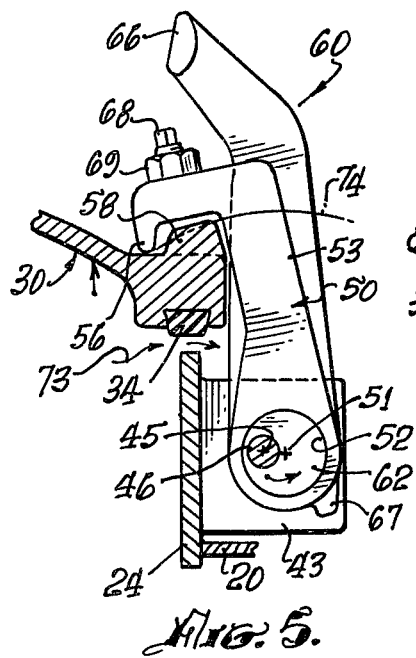
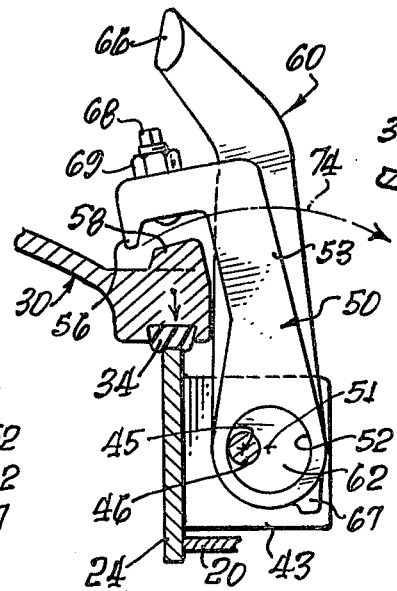
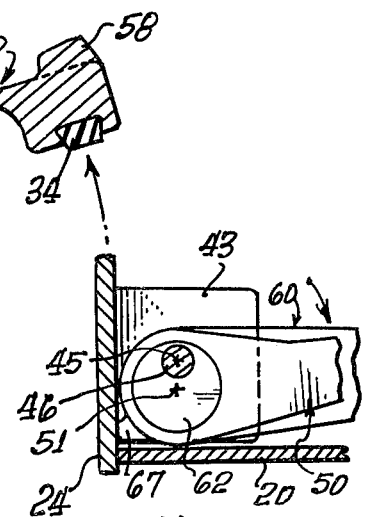
Fig. 5.  Fig. 6.  Fig. 7.
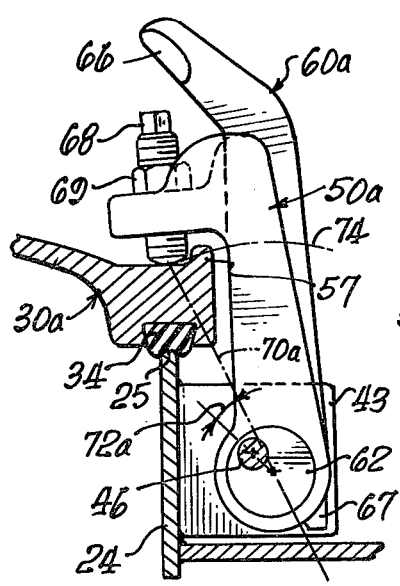
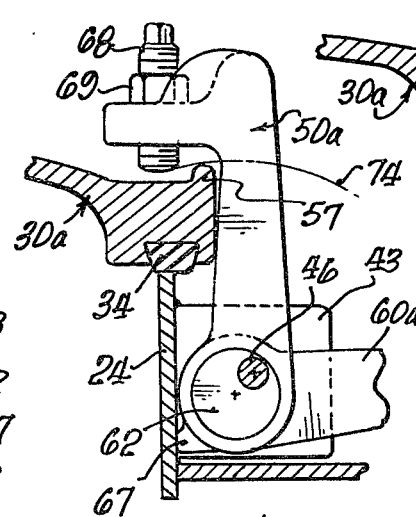
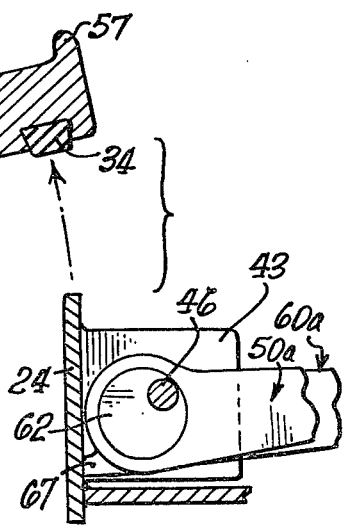
Fig. 8.  Fig. 9.  Fig. 10.

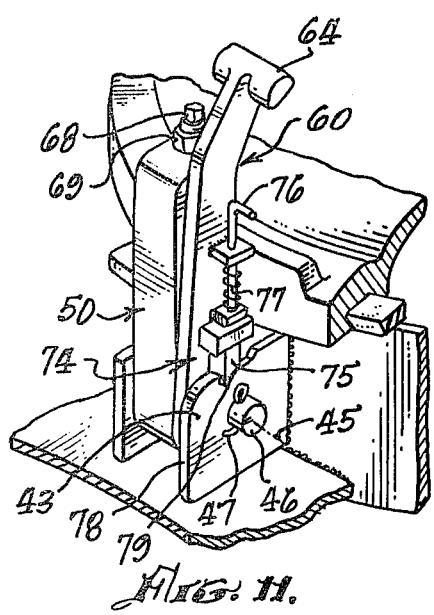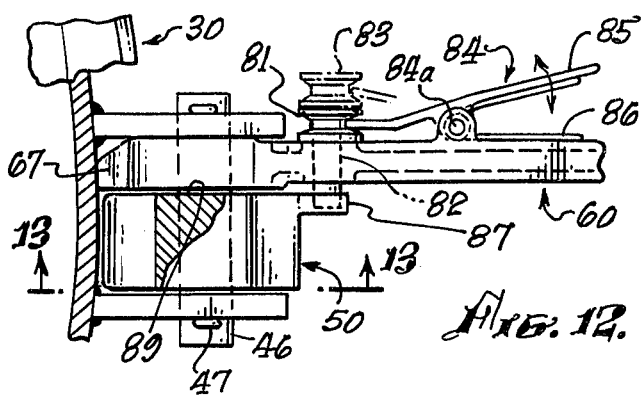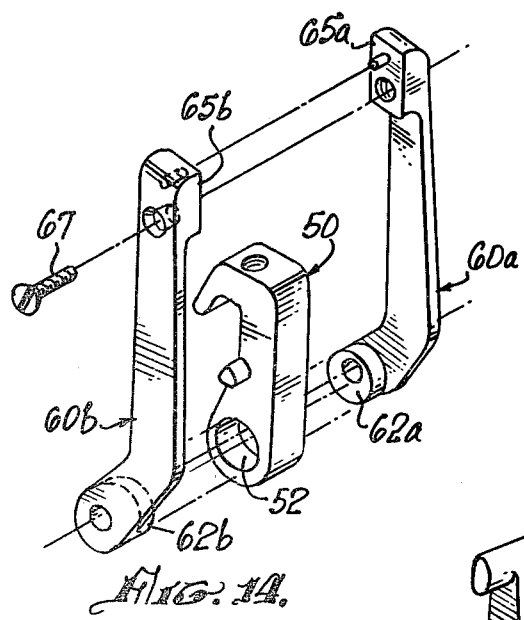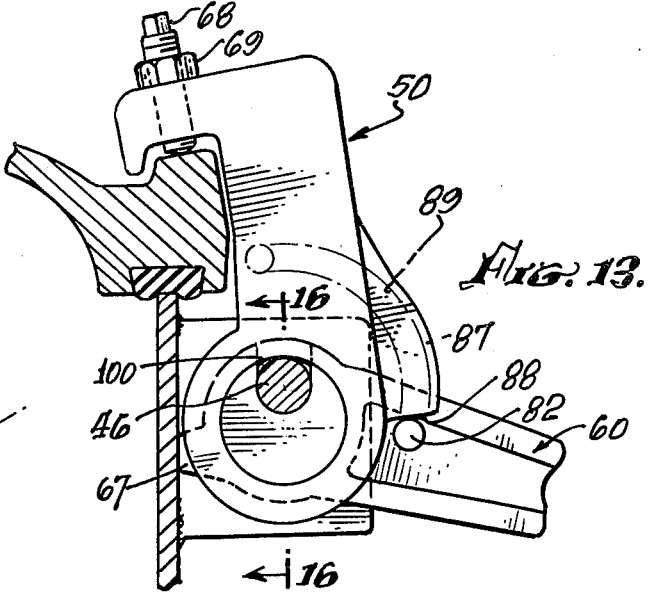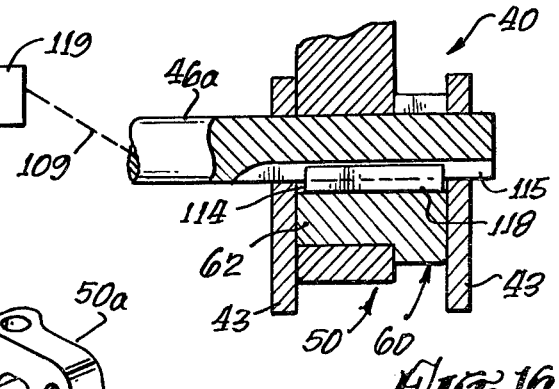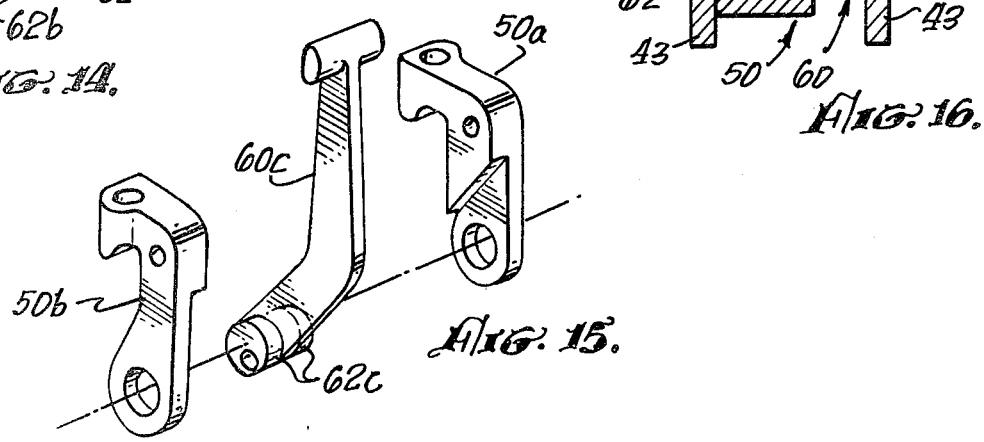

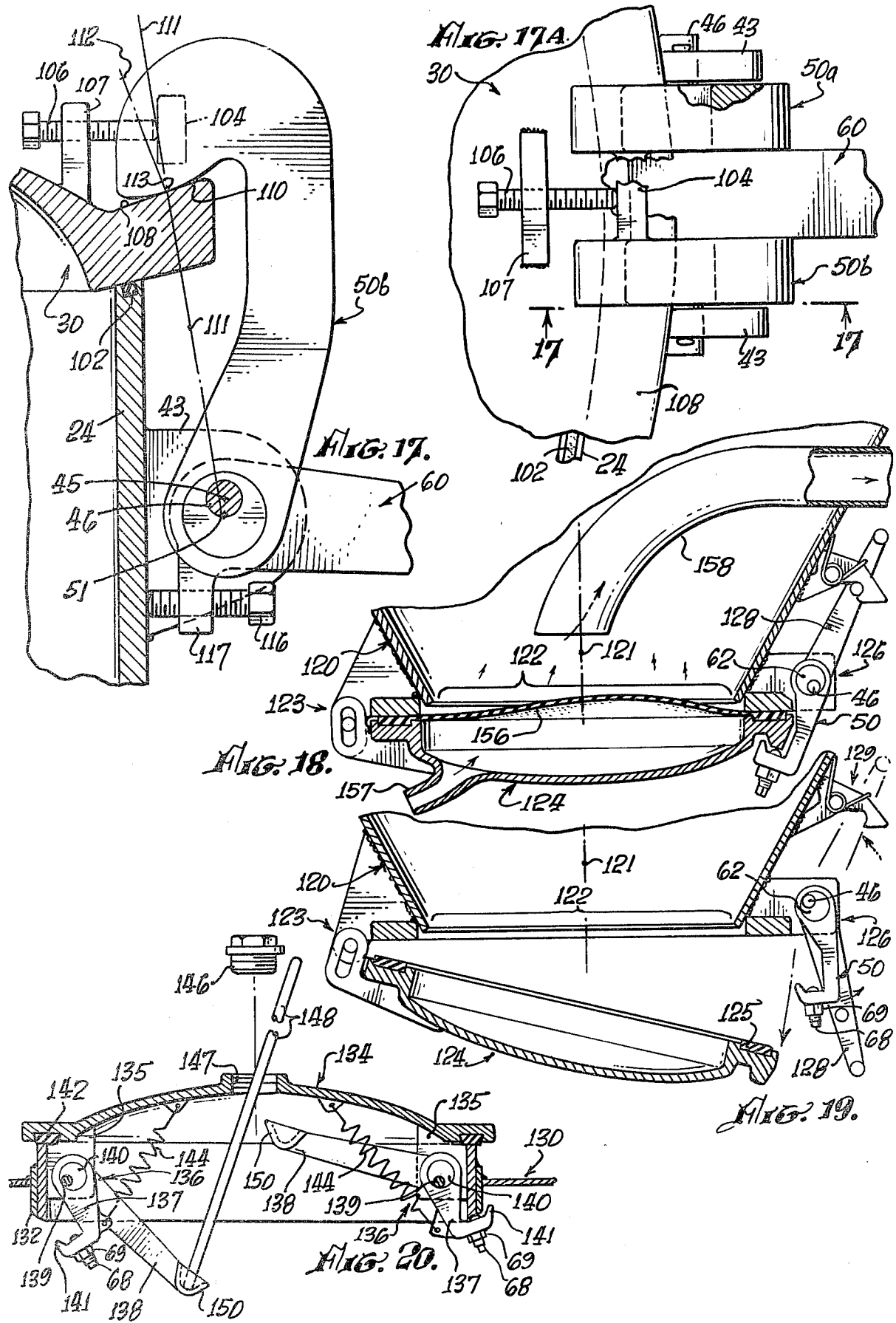

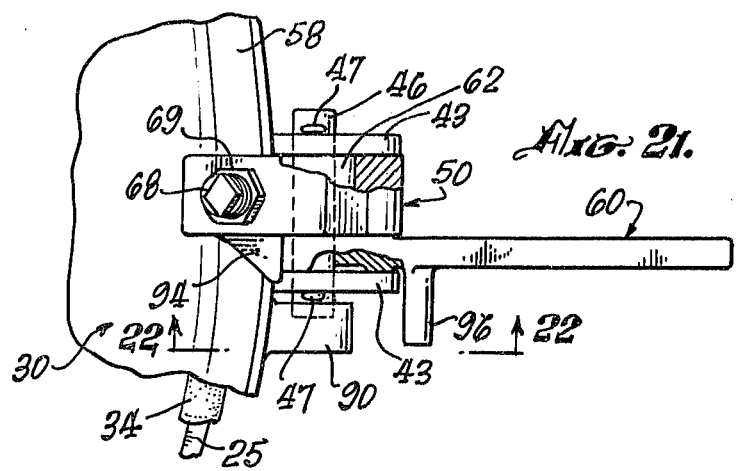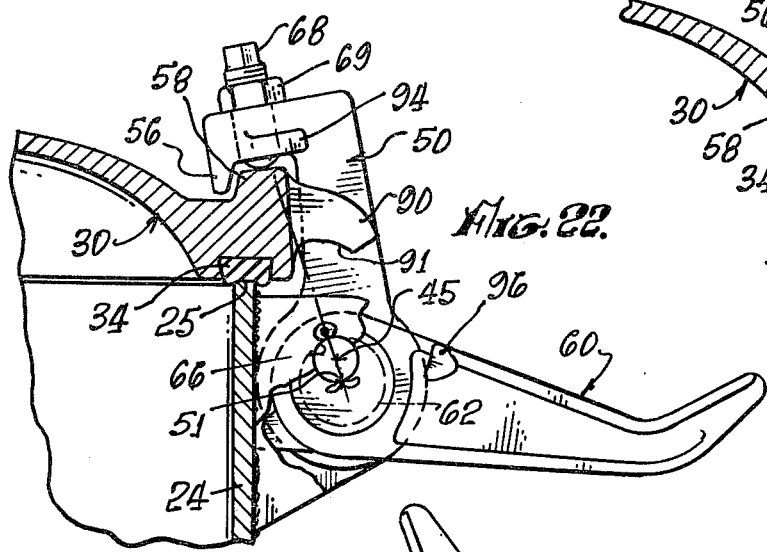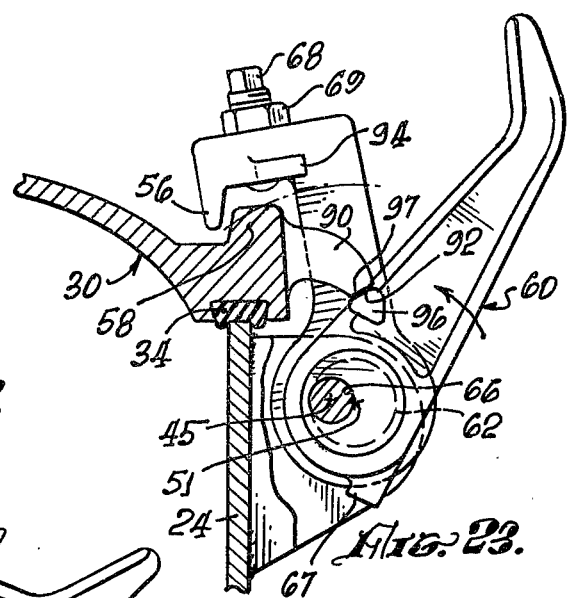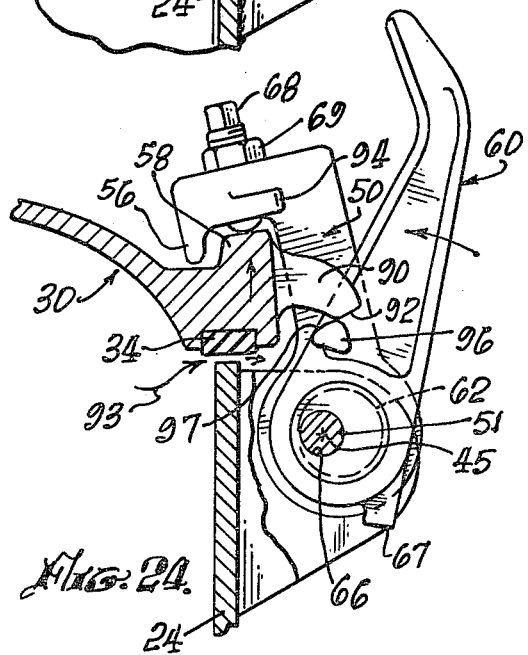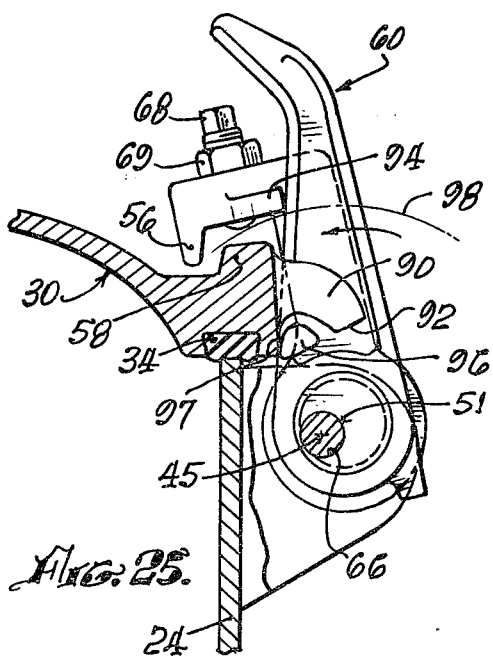

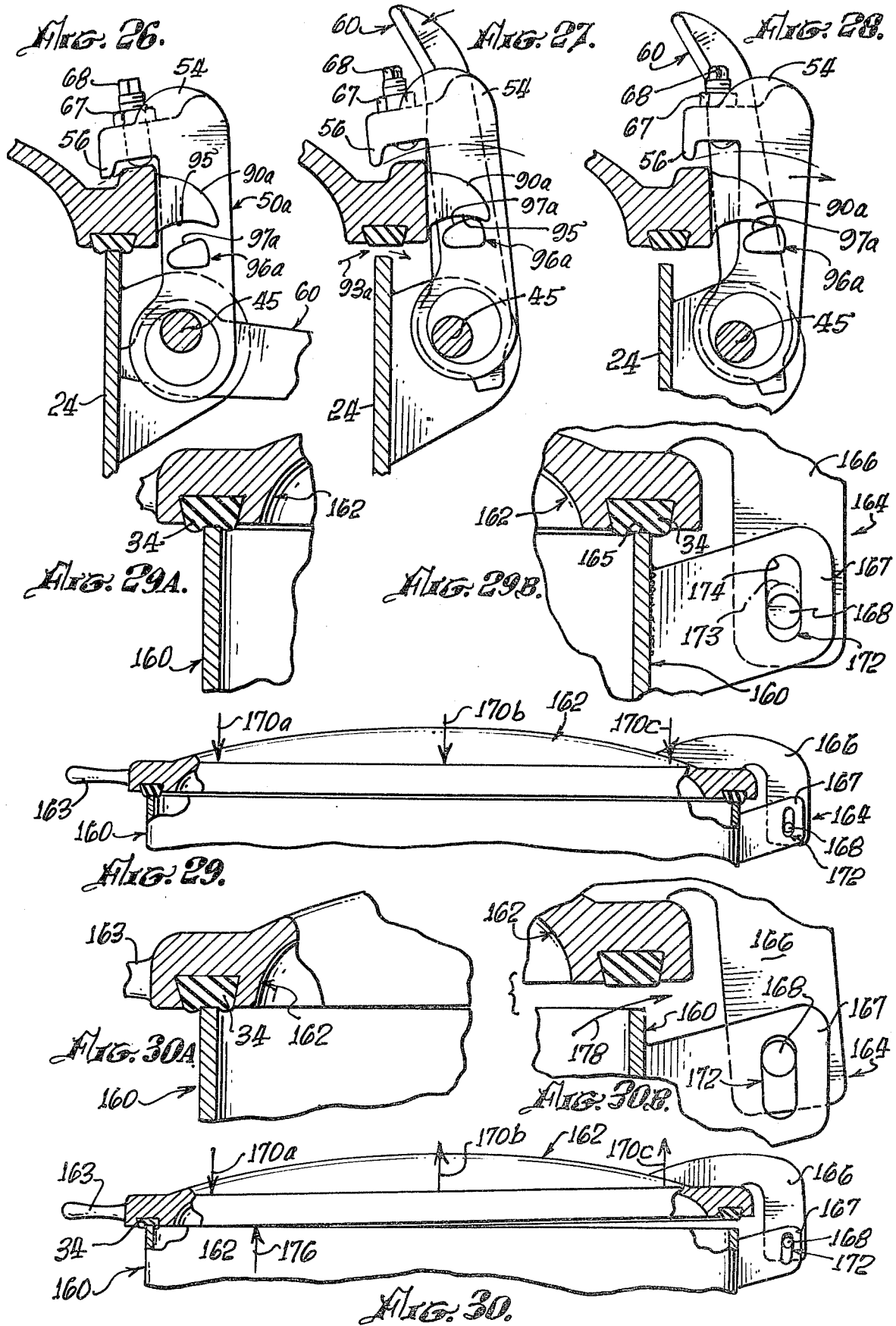

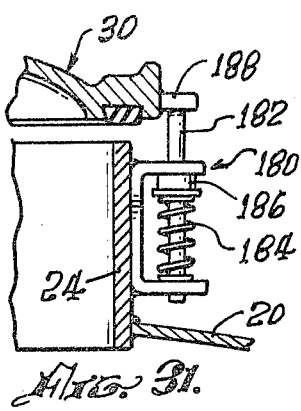
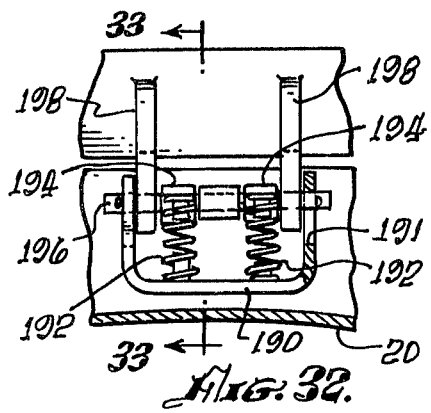
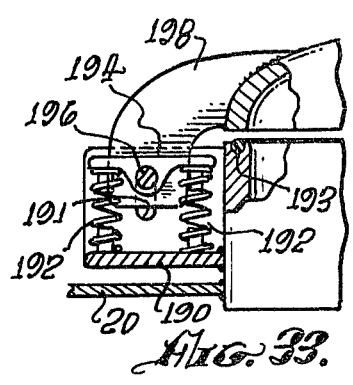
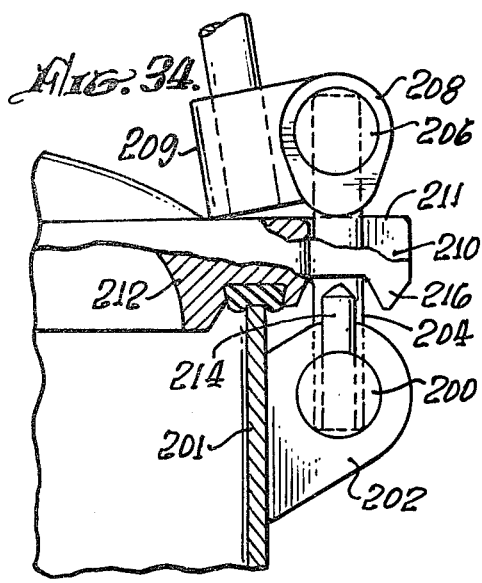
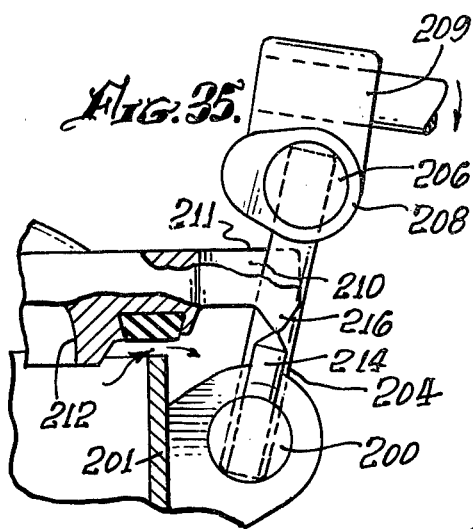
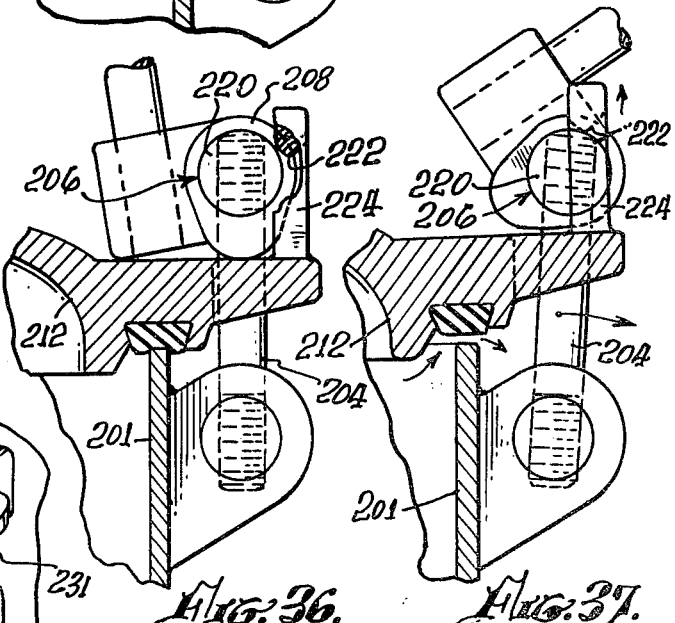
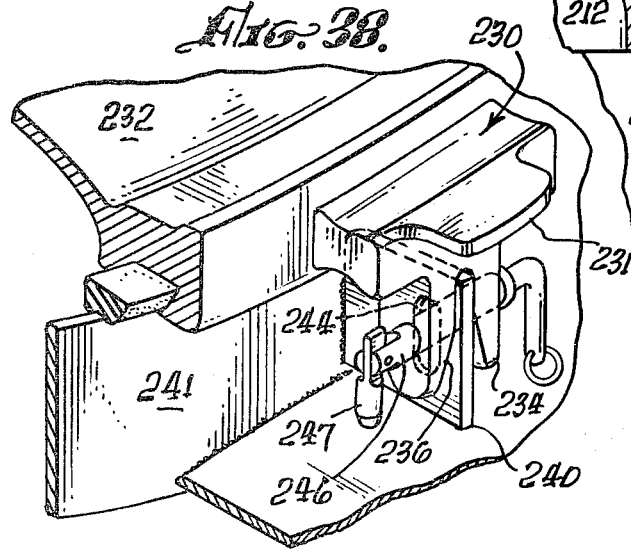

SAFETY CLAMPING SYSTEM FOR PRESSURE VESSEL CLOSURES AND THE LIKE

BACKGROUND OF THE INVENTION

This invention has to do generally with quick acting clamping mechanisms for releasably clamping two members firmly together, and with a novel eccentric structure that is useful in such mechanisms and for other purposes.

The invention is especially useful for releasably securing a movable member to a larger, relatively fixed member or base, as for securing a closure member over an aperture to seal a container.

Some aspects of the present invention relate especially to problems that arise when a vessel containing pressurized fluid is opened without first releasing all of its internal pressure. Under that condition the internal pressure may blow the closure wide open, damaging the apparatus or injuring the operator. Accordingly, without implying any necessary limitation, the invention will be described primarily as it relates to securing the closure of such vessels.

Clamp structures of the present invention are typically of the general type including a clamp arm which is pivotally mounted at one end on one of the members to be secured together, and which can be swung about the pivot axis between an idle position or range of positions entirely clear of the other member and a working position or range of positions in which the clamp arm limits relative movement of the two members. When in working position the clamp arm prevents complete separation of the two members, but without necessarily forcibly clamping them together. Actual clamping is obtained in one conventional type of structure, by shifting a hook formation along the clamp arm toward the pivot axis, as by cam or eccentric mechanism. The two members are thereby forced together into firm contact.

For sealing apertures in large pressure vessels such as tank trucks for handling pressurized fluids, for example, the closure member is typically clamped against the outwardly facing aperture rim by a plurality of individually operable clamping mechanisms distributed around the periphery. Improved clamping structures of that general type have been disclosed by the present applicant in his prior U.S. Pat. Nos. 3,269,587, 3,275,187 and 3,292,812. Those patents also describe and claim a variety of safety devices for insuring release of residual pressure from a pressure vessel before the closure member can be fully released. That is typically accomplished in those patented devices by positively blocking the clamp arm from swinging into idle position until after the closure has been lifted free of the aperture rim, which may be done manually or by the pressure itself. Venting action is thereby provided while the clamp arm is still in working angular position where it positively prevents the closure from flying open.

BRIEF DESCRIPTION OF THE INVENTION

One aspect of the present invention relates to an alternative manner of obtaining clamping action of a clamp arm of the described general type, namely, by shifting the pivot axis, and hence the entire clamp arm, relative to the member on which the clamp arm is pivotally mounted. The invention provides particularly suitable eccentric structure for producing such movement of the pivot axis. That structure is remarkably simple in design, is inherently rugged and is economical to produce and to maintain. Moreover, the structure is highly flexible with respect to such factors as the direction of handle movement and the magnitude and timing of the eccentric throw.

That aspect of the invention permits a highly compact structure to provide great mechanical strength in combination with rapid and reliable operation. The invention thereby solves a vexing problem in sealing closures on large pressure vessels, a field quite foreign to such relatively flimsy and complex clamps as that of U.S. Pat. No. 3,301,548, for example.

The eccentric structures of the invention are capable of securing large scale closures under a wide variety of conditions. Illustrative examples are openings at the bottom of pressure vessels and the like, doors between watertight compartments of ships, and openings in vessels designed to resist external pressure, such as submarines. In particular, the invention can provide for normal control of the latter closures from inside the vessel and for external control under emergency conditions. Also, clamp structures embodying the eccentrics of the invention can conveniently be coupled together in linear configurations for simultaneous operation, as for sealing a hatch cover on a ship, for example.

A further aspect of the invention provides improved apparatus for insuring that all pressure has escaped from a pressure vessel before the closure member is fully released. In preferred form of the invention, that is accomplished in a novel manner which further insures that the escape of any residual pressure will take place in a direction away from the operator. The cover for a manway at the top of a pressure vessel is typically mounted on one side by a hinge, and is provided with a handle on the other side by which it may be swung open about the hinge pivot after full release of the clamps spaced about its periphery. The operator normally works from the handle side of such a cover, and is thus directly exposed to the blast of escaping fluid if the cover is opened in the usual way. Such a blast may injure the operator directly, or may blow him off the tank with risk of injury from the resulting fall.

I have discovered that such hazards can be avoided by constructing the cover hinge so that it allows the hinge side of the cover to lift directly from its seat a short but strictly limited distance when the clamps are released. With such hinge structure, the operator releases the clamps in such order that one or two clamps opposite the hinge are released last. Such clamp or clamps are typically adjacent the handle, and will be referred to for convenience as handle clamps even if no actual handle is provided. When all clamps except such one or two handle clamps have been released, the resilience of the compressed gasket has been found to lift the cover from its seat at the hinge side, allowing any residual pressure to escape in a direction away from the operator.

A corresponding method is provided for closures sealed by O-rings or the like, for which the sealed position of the closure is positively defined by metal-to-metal contact without effective resilience. Under that condition, the invention preferably provides spring means near the hinge for yieldingly urging the closure away from its seat. Then, after all clamps have been released except one or two opposite the hinge the operator relieves those remaining clamps, releasing the clamping force but retaining the clamp arms in working angular position. The springs at the hinge then lift the hinge side of the cover, aided by any internal pressure, permitting the pressure to escape safely. The cover cannot fly open because its movement is strictly limited by the hinge structure on one side and by the clamp arm or arms which are still in working position on the other side. Incorporation of spring means in or near the hinge is also useful in closures sealed by resilient gaskets in order to supplement the above described action of that resilience.

The invention further provides useful mechanism for assisting the operator in carrying out the above described method of pressure release, whether with resilient gasket or non-resilient O-ring seal. That mechanism includes means of any suitable type for positively preventing the operator from releasing the clamp or clamps adjacent the closure handle until all other clamps have been released, thereby effectively forcing the operator to follow that prescribed order. Convenient apparatus for that purpose includes abutment structure which acts in response to operation of the clamp-relieving mechanism to positively lift the cover from its seat. If the cover is still held fast by other clamps such abutment means has the effect of positively preventing release of the handle clamps in advance of their prescribed order.

Such abutment structure has the additional advantage that, when the handle clamp or clamps are finally released, the clamp relieving action positively displaces the cover from its seat at the handle side. Hence, even if, for any reason, residual pressure is still present in the vessel, a path for its escape is produced in an entirely positive manner prior to full release of the cover.

The abutment structure to be incorporated in the handle clamps for the described purposes may take a wide variety of forms, and the specific structures described herein are intended only as illustration. In clamp mechanisms in which the pivot axis of the clamp arm is shifted to seal the closure, the closure member may in general be forcibly lifted from its seat either by a suitable abutment on the clamp arm itself or by structure mounted on the handle by which the clamp arm axis is being shifted.

In those clamp structures in which the closure is finally sealed by forcibly shifting a hook structure relative to the clamp arm, movement of that hook structure to relieve the closure may actuate suitable abutment or linkage mechanism which forces slight opening of the closure. Alternatively, such venting may be produced, for example, by positive cam action as the clamp arm starts to swing free of the closure, releasing any residual pressure while the clamp arm is still blocking complete release of the closure.

BRIEF DESCRIPTION OF THE DRAWING

A full understanding of the invention, and of its further objects and advantages, will be had from the following description of certain illustrative ways of carrying it out. That description, and the accompanying drawings which form a part of it, are intended only as illustration, and not as a limitation upon the scope of the invention.

In the drawings:

FIG. 1 is a perspective, partly broken away, representing a closure secured to a pressure vessel by clamping devices embodying certain aspects of the invention;

FIG. 2 is an exploded perspective representing one of the clamping devices 40a of FIG. 1;

FIG. 3 is a section on line 3—3 of FIG. 4;

FIG. 4 is a fragmentary section on line 4—4 of FIG. 3 representing a clamping device 40 of FIG. 1;

FIGS. 5 to 7 are sections corresponding to FIG. 4, showing different phases of operation;

FIGS. 8 to 10 are fragmentary sections similar to FIGS. 4 to 7, but representing a modification with opposite handle movement;

FIG. 11 is a perspective representing a clamping device with an illustrative safety latch;

FIG. 12 is a plan representing a clamping device with another illustrative safety latch;

FIG. 13 is a section on line 13—13 of FIG. 12;

FIG. 14 is an exploded perspective representing one illustrative form of symmetrical clamping device;

FIG. 15 is an exploded perspective representing another illustrative form of symmetrical clamping device;

FIG. 16 is a section on line 16—16 of FIG. 13 modified to illustrate another aspect of the invention;

FIG. 17 is a section on line 17—17 of FIG. 17A, showing a symmetrical clamping device with adjustment.

FIG. 17A is a plan corresponding to FIG. 17;

FIG. 18 is an axial section of a downwardly opening closure with an illustrative clamping device and with an air slide for delivering granular material;

FIG. 19 is a section similar to FIG. 18 but without the air slide and showing the closure released;

FIG. 20 is an axial section representing an aperture and closure for a vessel with external pressure, with clamping devices normally operated from inside and having emergency release from outside;

FIG. 21 is a fragmentary plan representing a clamping device with an illustrative safety cam mechanism;

FIGS. 22 to 25 are sections on line 22—22 of FIG. 21, showing different phases of operation;

FIGS. 26 to 28 are sections generally similar to FIGS. 22 to 25, but representing a clamping device with another illustrative safety cam mechanism;

FIG. 29 is a schematic elevation partly broken away representing a closure in clamped position;

FIGS. 29A and 29B are enlarged details of FIG. 29;

FIG. 30 is an elevation corresponding to FIG. 29, but showing partial release of the closure with blast control in accordance with the invention;

FIGS. 30A and 30B are enlarged details of FIG. 30;

FIG. 31 is a fragmentary section representing illustrative spring means for aiding blast control;

FIG. 32 is an elevation representing hinge structure incorporating further illustrative spring means;

FIG. 33 is a section on line 33—33 of FIG. 32;

FIGS. 34 and 35 are fragmentary sections representing an illustrative safety cam structure embodied in a known form of clamping device, showing two phases of operation;

FIGS. 36 and 37 are sections similar to FIGS. 34 and 35, but representing a modification;

FIG. 38 is a fragmentary perspective representing a closure centering device and lock, incorporated in a closure handle structure.

DESCRIPTION OF ILLUSTRATIVE EMBODIMENTS

Eccentric Structure

The eccentric structure of the invention will be described primarily as it is illustratively embodied in the improved closure clamps 40. Those clamps are shown in a variety of aspects in FIG. 1, in exploded form in FIG. 2, and in fragmentary axial section in FIG. 3. Each clamp is mounted on pressure vessel 20 by bracket structure 42, formed of the two support plates 43. Those plates are permanently welded to neck 24 in mutually parallel spaced relation on opposite sides of a plane through aperture axis 21, as shown clearly in FIG. 2 and at the left of FIG. 1 where one clamp is omitted for clarity of illustration. Bracket plates 43 have mutually aligned bores 44, which define the pivot axis 45 and receive the pivot pin 46, typically retained by cotter pins, or the like, 47. Pin 46 forms the primary support for the clamp structure.

Each clamp mechanism 40 comprises a clamp member 50 and an operating handle member 60. Clamp member 50 comprises the elongated arm 53, which is laterally enlarged at its inner end to accommodate the relatively large cylindrical bearing bore 52 with the axis 51. At its free end, clamp arm 50 carries suitable structure for engaging the closure member in certain angular positions of the arm, together with means for retaining the arm within such angular working positions in response to such engagement. Those functions may be performed by a wide variety of hook-like and retaining structures. They are shown illustratively as the simple angular hook 54 and the pronounced lip 56, which is adapted to cooperate with the boss 58 or equivalent structure on the closure member.

Handle member 60 comprises the shank portion 61, carrying at its inner end the cylindrical hub formation 62 with cylindrical axis 63 perpendicular to the length of the handle. That hub fits freely in bearing bore 52 of clamp arm 50 and acts as a plain pivot bearing for the swinging movement of that arm. The handle member itself is journaled on pivot pin 46 of support 42 by means of a through bore 66 parallel to the cylindrical axis of hub 62 and eccentrically offset from that axis. The magnitude of the eccentric offset of handle bearing bore 66 may have any desired value not greater than the hub radius minus that of bore 66. The latter is then substantially contained within the body of the hub. The handle carries at its free end a flat handle formation 64 to aid manual application of torque to hub 62.

A particular advantage of the clamp structure just described is the ease with which it can be mounted on a bracket of the convenient type shown at 42 without the need for first removing one of the bracket plates. Assembly of the clamp device itself requires only insertion of handle boss 62 into clamp arm bore 52. The assembled clamp is then mounted on bracket 42 by simply placing it between the two bracket plates 43 and inserting pivot pin 46 through bracket bores 44 and clamp bore 66. The pivot pin is then retained by whatever retaining device may be provided, such as the cotter pins 47. Disassembly is correspondingly straightforward and quick.

When so assembled and mounted, the working eccentric of the clamp mechanism is fully enclosed and protected by bracket plates 43. Thrust washers or the like may be provided if desired at the inner faces of the bracket plates, but it is generally preferred that those plates, or the corresponding opposed faces of an equivalent mounting structure, directly engage and guide the working parts of the clamp. Moreover, bore 66 in the handle member typically provides bearing support on pin 46 over the full pin length between the two mounting plates 43. Hence, the pin is subjected primarily to shear stress with a minimum of bending moment, providing optimum strength for a pin of given diameter and thus aiding compact design of the clamp structure.

The space available between bracket plates 43, indicated at 63 in FIG. 3, may be divided in any desired ratio between the thickness of the handle shank 61 and that of clamp member 50. The handle shank typically has a flat and relatively thin rectangular section, while clamp member 50 is relatively sturdy and occupies a major portion of dimension 63. The structure then provides ample bearing surfaces, both for the bearing of handle 60 on pivot 46 and for clamp arm 50 on the handle, so that adequate freedom of movement and durability are typically obtainable with plain bearings, even when operated dry. However, antifriction bearings of any suitable type may be provided if desired.

Clamp Operation

With the two members of clamp structure 40 assembled and mounted as described, swinging movement of handle member 60 about its support on pivot pin 46 causes hub 62 to move in a circular path about support axis 45 at a radius equal to the offset of bore 66 relative to the hub. The lower end of clamp member 50 is carried along that circular path, and that movement is translated by the clamp arm into generally vertical reciprocation of the hook-carrying free end of the clamp arm.

In the present embodiment fully clamped condition is obtained with handle member 60 generally horizontal and hence perpendicular to the clamp arm, as shown best in FIG. 4. That position is preferably defined by a positive stop, which may be provided by contact of the handle boss 67 with the outer cylindrical surface of aperture neck 24, for example. In that fully clamped position, hook 54 is drawn forcibly down on closure member boss 58, positively compressing gasket 34 onto aperture rim 25. Lip 56 of the hook then overhangs the radially inner edge of cover boss 58, retaining the hook securely on the boss.

Satisfactory control of the degree of compression of sealing gasket 34 in clamped position of the mechanism can often be obtained by suitable dimensioning of the parts. However, the clamping action is preferably made adjustable, as by the bolt 68 which is threaded in the bow of the hook so its lower end engages the flat upper face of cover boss 58 and forms the primary working surface of the clamp. Once adjusted, bolt 68 is typically locked by the nut 69, and normally requires further adjustment only to compensate wear of the parts or aging or replacement of the gasket.

The phase angle of the eccentric is preferably such that in fully clamped position pivot axis 45 is somewhat over center with respect to the direction of the generally upward thrust exerted by the clamp hook upon hub 62. That thrust line is indicated at 70 in FIG. 4, and the over-center angle is shown at 72, somewhat exaggerated in size for clarity of illustration. That overcenter angle may be made adjustable, if desired, as by providing rotary adjustment between the handle shank and hub 62, or by making stop boss 67 adjustable, as typically shown in FIG. 17, for example. Hub 62 may be preferred to form an integral part of the handle, so that timing of the eccentric action is determined inherently by the azimuth position of bearing bore 66 about the hub axis. The described over-center relation in fully clamped position has the advantage of producing a torque on the handle in a direction tending to maintain it in clamping position. The mechanism is thus retained securely in clamped position under most conditions, though a positive latch may be desirable for additional safety, as described below.

To release the clamp, handle 60 is swung counter-clockwise as seen in FIG. 4 about support axis 45 against the described retaining torque, carrying eccentric hub 62 past dead center and far enough beyond to remove all clamping force from the closure. If residual pressure should remain in the pressure vessel while the last clamp is being released, that pressure typically lifts the closure along with the clamp arm, releasing the seal and venting the pressure as represented schematically at 73 in FIG. 5. During that action, lip 56 remains latched over lug 58, safely preventing full release of the clamp arm until after the closure has fallen back onto its seat, as in FIG. 6. Lip 56 is then high enough to clear boss 58, as indicated by the arc 74. Hence the clamp arm may be swung manually, together with handle 60, in a clockwise direction about support axis 45 to the idle position of FIG. 7, completely releasing the closure.

The described clamp structure can readily be modified to reverse the control movement of handle member 60, that is, to produce full clamping of the closure with the handle member generally parallel to the clamp arm and to release the cover when the handle is transverse of the clamp arm. Such modification is illustratively shown in FIGS. 8, 9 and 10 in respective fully clamped, relieved and fully released positions. The primary structural difference required to produce that functional change is a shift in the azimuth position of bearing bore 66 in hub formation 62 of handle member 60. The required magnitude of that angular shift depends upon the angular difference between the desired handle clamping positions and also upon their respective over-center angles. Those over-center angles are indicated at 72 and 72a in FIGS. 4 and 8, and will be seen to lie on opposite sides of the respective clamp thrust lines 70 and 70a, in such directions that the required angular shift of bore 46 equals approximately the angular difference between the two handle clamping positions minus the sum of the over-center angles, if any, for the two embodiments.

The transverse, or handle-down, clamping position of FIGS. 4 to 7, for example, usually permits the pivot pin to be located somewhat closer to aperture neck 24, tending to reduce the lateral component of the clamp thrust for given overhang of the cover rim beyond neck 24. That configuration also stows the handle close to the vessel wall during normal use of the apparatus, where it is out of the way and can readily be latched. Moreover, any friction between hub 62 and the clamp arm tends to hold the clamp arm in closure limiting position during clamp relieving handle movement.

On the other hand, under some conditions the operator can more conveniently exert a strong releasing torque on the handle when its clamping position is vertical, as in FIG. 8. Also, the vertical or parallel clamping position is well adapted for remote operation. For that purpose, a selected degree of friction is provided between eccentric hub 62 and the clamp arm, and outward swinging of the clamp arm is limited, as by a fixed or adjustable stop, to a small fraction of the angular throw of the handle member. Handle member movement, whether in releasing or clamping direction, then carries the clamp arm along with it between its working and idle angular positions. Thus only the handle member needs to be directly driven to operate the clamp.

FIGS. 8, 9 and 10 also show an alternative structure whereby the clamp arm is retained in working angular position by means of a vertical retaining flange 57 formed at the extreme periphery of closure 30a and directly engaging an abutment on the clamp arm. That abutment may conveniently comprise the side of adjustable bearing member 68.

The shape of the vessel may permit the clamp handle to travel more or less than the typical range of about 110°, and that travel may reach 180° or more, as in FIG. 19, for example. Such differences of travel can often be compensated by altering the throw of eccentric hub 62. However, the eccentricity is limited for given hub radius and support shaft radius, since the shaft must not extend radially outside the cylindrical hub surface. The maximum eccentricity thus equals the difference of those radii. If space permits, the eccentricity can be increased almost without limit for a given shaft diameter by increasing the diameter of the hub. Such increased eccentric throw may be employed, for example, to produce a given longitudinal travel of the clamp arm with a smaller handle swing, or to increase the travel of the clamp arm, affording even more ample dimensions of retaining lip 56 or its equivalent.

In structures employing the described tangential relation of support shaft and eccentric hub, it is sometimes desirable to replace the described bore 66 in hub 62 by an axial channel in the hub surface having a width and depth both equal to the shaft diameter. Such channel mounting of the support shaft is illustrated at 100 in FIG. 13, other features of which are described below. The bottom of that channel is preferably cylindrical, providing support for the shaft over virtually its whole area in clamped position of the mechanism.

Safety Latch

To prevent accidental release of the clamping mechanism of the present invention, it may be desirable, even in presence of the described over-center feature, to provide a safety latch which positively retains control handle 60 in clamping position until released by the operator. A particularly effective and convenient safety latch structure for retaining a handle in vertical clamping position is shown at 74 in FIG. 11. The pawl 75 is mounted on the shank of handle member 60 for longitudinal sliding movement, and is strongly biased by the spring 77 toward support axis 45. The arcuate edge 78 of main bracket 43 is notched at 79 to receive the pawl working edge in position to retain the handle positively in fully clamping position. The latch is conveniently releasable by lifting the hand grip 76, which is coupled to the pawl and is positioned within easy reach of the fingers of a hand gripping operating handle 64.

A control handle having its clamping position transverse of the clamp arm may be latched by similar latch mechanism with its pawl inclined in the opposite direction. Also, additional notches may be provided at selected angles about support axis 45 for latching the handle in selected intermediate positions.

A further aspect of the invention provides a preferred form of safety latch which is especially effective with clamp structures in which full clamping position of the handle member is generally transverse of the clamp at a position defined by a positive stop such as stop boss 67 of FIG. 4, for example. That improved safety latch structure acts between the handle member and the clamp arm, latching those two members against swinging movement toward each other. A particular advantage of such a latch is that it not only retains the handle in clamping position but also retains the clamp arm in its working position. The latch thus supplements and may even replace more direct clamp arm retaining mechanisms such as clamp lip 56, for example.

An illustrative form of latch acting between the handle and clamp members is shown in FIGS. 12 and 13, comprising the latch pin 82. That pin is mounted in a transverse bore in handle arm 60 for sliding movement between the working position illustrated, with its working end projecting from the handle face that is adjacent the clamp arm, and a retracted position flush with that handle face. That pin movement is typically driven by the lever 84, pivoted at 84a on the handle with one end engaging the spool 81 on the other end of the pin. Lever 84 is urged toward working position of the pin by suitable spring means, shown as the coil spring 86 which is wound about the lever pivot with one end bearing on handle 60 and the other on the lever. The lever end 85 opposite to spool 81 serves as handle for shifting the pin to releasing or idle position, indicated at 83 in FIG. 13. Clamp arm 50 is formed with a lateral extension 87 terminating at an abutment 88 in position to fittingly engage the side of pin 82 in fully clamped position of the mechanism. The clamp arm and extension 87 are formed with a flat surface along the arcuate path followed by the working end of pin 82 during normal operation of handle member 60 for releasing the clamp, as already described.

In operation of the latch mechanism of FIGS. 12 and 13, latch pin 82 is automatically projected into the working position shown whenever clamp member 50 and handle member 60 are in fully clamping position. The pin prevents movement of either member toward the other, and its movement away from the other is prevented by positive stops such as the rim of closure 30 and stop boss 67 or its equivalent. To release the clamp, lever handle 85 is momentarily pressed toward handle 60 and then released as that handle is moved upward. Throughout any other clamp operation, latch pin is held in idle position by sliding of its end along the smooth path 89.

Symmetrical Clamp Structures

It is sometimes advantageous to have handle member 60 symmetrical, in the sense that the force applied to handle formation 64 acts in a plane at the axial center of bearing bore 66, so that no twisting moment is applied to the bearing. That can be accomplished, for example, by offsetting the end portion of the handle shank, or merely the handle formation itself, in the appropriate axial direction. A fully symmetrical handle structure is represented in exploded perspective form in FIG. 14. The unitary handle member 60 of FIG. 2, for example, is replaced by the two parts 60a and 60b, which are mirror images of each other and which symmetrically embrace clamp member 50. The two handle sections carry respective eccentric bosses 62a and 62b, which enter opposite ends of bore 52 of the clamp member and share the dual function of providing a bearing support and eccentric drive for the clamp arm. The outer handle ends carry oppositely offset formations 65a and 65b, which typically meet at the plane of symmetry and are rigidly coupled, as by dowel pins and the screw 67, to form when assembled an effectively unitary handle member.

An alternative method of providing clamp symmetry is represented in FIG. 15, wherein two mating clamp arms 50a and 50b are journaled on respective cylindrical bosses 62c projecting oppositely in mutual alignment from the unitary handle member 60c. The illustrative symmetrical structures of FIGS. 14 and 15 retain the previously described advantage of easy mounting on a support structure comprising two fixedly mounted plates, as shown at 42 in FIG. 1, for example. Corresponding symmetrical structures are available also when the present form of eccentric is employed for purposes other than the clamping of closure members.

Symmetrical clamps of the general configuration shown in FIG. 15 may be constructed with two entirely independent clamp arms, which are then typically moved in unison during clamping and releasing operations. FIGS. 16 and 17 illustrate an intermediate arrangement in which the clamp arms 50a and 50b are not directly joined together, but are rigidly coupled via the cross bar 104. That coupling structure leaves handle member 60 more free than in FIG. 15 to swing between the two members of the effectively unitary clamp arm.

FIGS. 17 and 17A further illustrate use of a sealing gasket 102 of O-ring type, which is set in conventional manner in a groove in one of the mating faces of cover 30 and neck 24. Those faces typically make direct and positive contact without resilience. Such sealing structure is especially effective for retaining high pressures, and requires particularly accurate adjustment of the clamping action.

The present structure further illustrates an alternative and especially accurate manner of adjusting the tightness of clamping by variation of the angular position of the clamp arm in fully clamping condition. That clamp arm position may be adjustably defined in any suitable manner. As illustrated, the screw 106 is threaded in the bracket 107, fixed to closure member 30, in such position that the screw end abuts the inner side face of cross bar 104, limiting the inward movement of the entire clamp arm structure. In structures employing a single clamp arm, screw 106 typically abuts that arm directly. The upper face 108 of the closure periphery, which receives the clamp thrust in the direction indicated by the line 111, is made slightly oblique to that line in the direction to produce a lateral force component tending to move the clamp arm toward stop screw 106, insuring contact with the stop and providing the desired tightness variation.

The contact surface 110 of clamp arm 50 is preferably curved generally cylindrically about an axis in a position such as 112, which lies on a line perpendicular to surface 108 and hence offset from thrust line 111 toward the closure. When two mutually spaced clamp arms are used, as in the present symmetrical structure, each surface 110 is typically formed to take account of the curvature of the closure rim, as by making its cylindrical axis 112 approximately parallel to the closure edge at that clamp arm. The clamp then contacts closure surface 108 essentially along a line, indicated at 113. As stop 106 is adjusted to the right as seen in FIG. 17, contact line 113 shifts to the right on closure surface 108, tightening the clamp, while opposite adjustment gives the opposite result.

Since that adjustment alters the direction of thrust line 111, disturbing the over-center angle of eccentric hub, the invention further provides a compensating adjustment of the angular position of handle member 60 in its fully clamping position. As illustrated, such adjustment comprises the screw 116, adjustably threaded in the handle boss 117 and abutting the face of neck 24.

Modified Structures and Functions

In general, all of the clamping devices described above can be used effectively for closing apertures that open in any orientation with respect to gravity. Such terms as up and down in connection with such devices are intended to refer only to the illustrative positions shown in the various drawings.

Two or more clamping mechanisms according to the invention may be operated in unison by a single handle or other driving mechanism. That is especially useful when several clamps are set in a straight line, as for clamping one side of a rectangular closure such as a ship's hatch, for example. Such combined drive is typically obtained by coupling the handle member of each clamping device to the pivot shaft, and externally connecting the shafts. An illustrative coupling structure is shown in FIG. 16, which is drawn for clarity as a section taken on the line 16—16 of FIG. 13. The device may include other features of the present invention, but need not do so.

In FIG. 16 the key 118 is inserted in the keyway 114 in the handle member 60 before assembly, and is then received by the shaft keyway 115 as the shaft is inserted. Rotational movement of the handle member and its eccentric boss 62 is thereby coupled to shaft 46a without otherwise affecting the described operation. Shaft 46a may then, for example, be drivingly coupled to one of more similar clamping mechanisms, represented schematically at 119 with coupling structure at 109. If each device has a handle arm, all can be operated in unison by the handle of any one; or, if drive is always from the same device, the handles on the others may be omitted. The handle members are then typically reduced to eccentrically mounted cylindrical hubs on which the clamp arms are journaled. The bearing surface for each clamp arm on the eccentric hub then preferably extends the full distance between support plates 43, and the axial thickness between support plates 43, and the axial thickness of the clamp arm is correspondingly increased.

As an alternative, box 119 in FIG. 16 may represent a power drive mechanism of any suitable type for operating clamp 40 or a series of aligned clamping devices, with remote control if desired. Such drive mechanisms are well known, and may be driven and controlled hydraulically or electrically, for example, and may use explosive cartridges as a source of operating power.

FIGS. 18 and 19 represent clamping mechanism especially suitable for sealing an aperture 122 that opens downwardly on the axis 121 for discharge of material from the conical bottom 120 of a tank truck or the like. The closure 124 is hinged at 123, and is secured by a series of clamps 126, of which only one is shown. In the clamped position of FIG. 18, the handle 128 is latched for safety by the spring latch 129, which may supplement over-center action of the eccentric hub. Upon release of latch 129, handle 128 can swing downward through some 140° to release clamp 126. With similar release of other clamps, the closure is free to swing open as in FIG. 19. The idle clamp arm is then preferably coupled to handle 128, as by a spring detent not explicitly shown, and the handle is returned to the latched position of FIG. 18, carrying the clamp arm with it clear of aperture 122.

An alternative form of delivery for granular material, shown only in FIG. 18, does not require release of closure 124. The fabric air slide 156 extends across aperture 122, being typically clamped in place by closure 124. It directs compressed air from the inlet 157 as a uniform upward flow to fluidize granular material and expel it through the discharge duct 158.

The unusual versatility of the present invention is well illustrated by the clamp structure of FIG. 20, which is intended normally to be operated from within the vessel 130, but can be released under abnormal conditions from outside that vessel. That capability is useful, for example, for securing openings in a submarine or the like, which are normally operated by the crew but may require external release if the crew should be incapacitated.

The clamps of FIG. 20 further illustrate the general fact that the clamps of the invention may be mounted on the closure member itself, rather than on the vessel. Closure member 134 for the opening defined by the neck 132 in the vessel 130 carries the brackets 135 near its inner periphery. The clamps 136 comprise the handle members 138, pivoted on brackets 135 by the pivot shafts 139 in the general manner already described. The clamp arms 137 swing on the hubs 140 carried by the respective handles in eccentric relation to the pivot shafts. Any desired number of clamps may be provided, only two being shown explicitly.

In fully clamped condition, represented by the right-hand clamp of FIG. 20, handle 138 is generally parallel to the closure member and is retained in that position by over-center relation of eccentric hub 140. Clamp arm 137 grips the inner edge of the aperture neck and is drawn upward by hub 140. A downward reaction is thereby exerted on the closure which presses sealing gasket 142 against the outer periphery of the neck. The clamp arm is firmly retained on neck 132 by the lip 141, but is yieldably urged away from that position by suitable spring means, represented for clarity as the coil spring 144.

To release the clamp, handle 138 is pulled downward, causing the eccentric hub to lower clamp arm 137 enough to free its lip from the aperture neck, as shown for the clamp at the left of FIG. 20. Spring 144 then draws the clamp arm radially inward away from the neck. After all clamps are released the closure can be lifted by any desired means, not explicitly shown.

If the closure is to be released from outside vessel 130, the plug 146 is removed from the central hole 147 in closure 134, and a rod 148 or equivalent instrument is inserted through that hole and into the socket 150 provided at the end of each clamp handle. Each clamp handle in turn is pressed down, releasing its clamp arm, which is drawn automatically to idle angular position by the spring 144. The clamp structure thus provides easy and rapid emergency access from outside the vessel.

Release of Residual Pressure by Clamp Operation

A further aspect of the invention provides security against the possibility that during release of the closure a dangerous amount of internal fluid pressure might remain in the pressure vessel, but would still fail to lift the closure and escape during the clamp relieving phase shown in FIGS. 5 and 6, for example. One illustrative embodiment of that aspect of the invention is represented in FIGS. 21 and 22. FIGS. 23 to 25 show successive stages of the clamp releasing operation. In that particular form of the invention, cam mechanism is provided by which movement of the handle to clamp relieving position directly and positively raises the closure member from its seat, releasing internal pressure while the clamp arm still blocks further closure movement.

The safety structure of the present embodiment includes the integrally formed safety lug 90 on closure member 30 and the safety cam 96, which is typically formed in the same manner on handle member 60. Lug 90 extends generally radially from the closure rim, with a downwardly angled hook formation 91 at its end. Cam 96 projects from one side of the handle shank parallel to support axis 45 in position to engage the hook portion of lug 90 during handle movement from the fully clamped position of FIG. 22 toward clamp relieving position.

FIG. 23 shows cam face 97 just engaging the oblique lug face 92 and about to cam closure 30 positively upward off its seat on aperture rim 25. At this stage, clamp lip 56 preferably continues to overhang closure boss 58, continuing to prevent angular movement of the clamp arm toward idle position.

FIG. 24 shows closure 30 cammed positively upward to lift gasket 34 off its seat, allowing any residual pressure to escape from the pressure vessel, as indicated at 93. That positive lifting of closure 30 keeps lip 56 securely engaged with closure boss 58, despite the continuing upward movement of clamp arm 50. Once gasket 34 has been positively broken loose from its seat on rim 25, as in FIG. 24, the pressure itself keeps that path open till the internal pressure has decreased to a safe value. Hence, the upward swinging movement of handle 60 does not need to be checked at the position of FIG. 24. In practice, the handle is typically swung in a single continuous stroke to the final clamp relieving position, which may be defined by a small stop lug 94 projecting from the side of clamp arm 50 into the path of the handle (FIG. 25).

As soon as cam 96 has passed the hook formation of closure lug 90 and the pressure vessel has returned to atmospheric pressure, closure 30 drops by gravity to the position of FIG. 24. That action, plus the continuing upward movement of clamp arm 50 due to rotation of eccentric hub 62, causes lip 56 to be clear of closure lug 58, finally permitting the clamp arm to be swung entirely free of the closure.

Stop lug 94 facilitates such swinging of the clamp arm and handle arm as a unit to a generally horizontal idle position. It is immaterial that the initial outward movement of the handle causes cam 96 to lift the cover again momentarily as it slides along the under face of lug 90, since by that time lip 56 has already cleared the inner edge of boss 58, swinging along the arc 98 about support axis 45. That arc is typically inclined upward relative to the upper face of boss 58 sufficiently to maintain clearance between the lip and that face as the cover is lifted. Alternatively, or if greater clearance is desired, lug 90 may be made longer than shown, so that lip 56 will be entirely clear of boss 58 before cam 96 has appreciably lifted the closure. With both the clamp arm and handle in extreme idle position, typically close against the vessel wall in the manner of previous FIG. 7, closure 30 can be swung wide open about its hinge joint. The clamp mechanism is then well out of the way during operations such as unloading and loading the vessel.

When the closure is again to be clamped shut, the operator needs only to swing the handle upward, and lug 94 causes the clamp arm to swing with it. The closure is again momentarily lifted as cam 96 engages closure lug 90, in the general manner shown in FIGS. 23 and 24, and is again dropped as the handle reaches the position of FIG. 25. During the movement, lip 56 clears boss 58 for essentially the same reasons already described in connection with the opposite movement during closure release. To tighten the clamp, handle 60 is swung back down, the clamp arm being lightly restrained against the outward torque due to friction of the pivotal bearing between the eccentric handle boss 62 and the clamp arm. Since that bearing is initially loaded only by the weight of the clamp arm itself, that restraint requires only light touch of a finger until lip 56 takes over the restraining function.

The invention may further provide functions corresponding generally to those just described, but with the closure-lifting action driven in response to movement of the clamp arm rather than that of the handle member. That difference in structure affords differences in function which are useful under certain conditions. As seen in FIGS. 26 to 28, the safety cam 96a projects directly toward the viewer from the side face of clamp arm 50 that is opposite to handle member 60, the latter member being shown behind the clamp arm for clarity of illustration. The safety lug 90a projects radially from the rim of closure 30, much like lug 90 of FIGS. 21 to 25 but typically differing in detailed shape.

In operation of the present embodiment, to release the clamp from the fully clamped position of FIG. 26 the operator swings handle member 60 upward to the clamp relieving position of FIG. 27. That action carries the lower end of clamp arm 50a first outward away from neck 24 and then upward about support axis 45, causing cam 96a to engage the underside of lug 90a and forcibly lift closure 30 from its seat. That action positively opens a passage 93a for escape of any residual pressure. The clamp arm is positively retained in working angular position by lip 56 until the handle movement is virtually completed. Only then is the clamp lip released from closure boss 58, allowing the operator to swing the clamp arm manually to idle position. However, that action carries cam 96a along the underside of lug 90a, camming the lug upward and further opening the path at 93a for pressure equalization, as shown in FIG. 28. Accordingly, by the time the clamp arm has fully released closure member 30, any residual pressure has had ample time to escape. Both the clamp arm and handle are then swung down to idle position, as in FIG. 7, for example.

To reseal the closure, the handle and clamp arm are typically swung upward manually together, causing the upper face 97a of cam 96 to engage the point of lug 90a, lifting closure 30 momentarily from its seat and partially dropping it to the position of FIG. 27. Handle 60 is then pulled down to the fully clamping position. That action is possible only if the clamp arm has been properly seated with lip 56 overhanging closure lug 58. Thus, there is no possibility of failing to obtain proper placement of the clamp.

The two illustrative structures of FIGS. 21 to 25 and FIGS. 26 to 28 have the advantage of being extremely simple mechanically and hence potentially inherently rugged. Thus, they are especially suitable for use in the highly inhospitable environments that are often met by large pressure vessels, for example. However, a great many cam and linkage mechanisms are well known, and are capable of producing closure motions such as have been described, and of providing flexible control of amplitude and timing relative to the movement of the drive member. Accordingly, whenever the conditions of use make such structures acceptable, a wide variety of more elaborate coupling mechanisms are to be considered the functional equivalents of the simple cam structures that have been described.

Control of Blast Direction

A further aspect of the present invention provides a method and apparatus for directing the blast of released fluid pressure in a preferred direction away from the normal position of the operator. The above described clamp structures, in which the action of relieving the clamp also positively releases any residual pressure, are a useful aid in carrying out that method.

FIG. 29 represents in schematic elevation a typical pressure vessel 160 with the closure member 162 connected to the vessel on one side by the hinge structure 164 and provided with the handle 163 on the other side for opening the closure after all clamps have been released. The clamps are typically equally spaced about the periphery, as shown more fully in FIG. 1, forming pairs of clamps which are directly opposite from each other across the vertical plane through the hinge and handle and parallel to the plane of FIG. 29. The two clamps of each such pair will be assumed to be always operated together. That clamp arrangement is assumed for illustration only, since the principles to be described will be seen to apply to many diverse arrangements of multiple clamps.

In the broadest sense of the present aspect of the invention, the clamping devices themselves may be of substantially any type capable of reasonably rapid operation. Hence the three clamp pairs that are shown illustratively are represented only schematically as the respective arrows 170a, 170b and 170c at the positions of force application, the two clamps of each pair appearing superimposed. Fully clamped condition of a clamp pair is indicated by an arrow directed downward upon the closure rim, released condition by an arrow directed upward. Thus FIG. 29 represents fully clamped condition of the closure, with all six clamping devices in clamped condition and with the resilient gasket compressed essentially uniformly all the way around. That condition of the closure itself is shown more clearly in FIGS. 29A and 29B, which are enlarged fragmentary sections at the handle and at the hinge, respectively.

In accordance with the present aspect of the invention, hinge 164 is so designed that the closure is allowed appreciable upward translational movement from its normal seat on aperture rim 165. That closure travel is typically made possible by extending the length of the slightly slotted holes in which the hinge pin is customarily mounted, that slot extension being in the direction corresponding to upward closure movement. As shown, the pivot pin 168 passes through fitting holes in the cover hinge brackets 166 and through the slotted holes 172 in the fixed hinge brackets 167. Slotted holes 172 have their lower ends at the normal position, but extend upward beyond their normal termination, shown typically as the dotted line 173, to the extended termination 174. The permitted vertical closure travel is thus not limited to the normal range which is conventionally allowed to accommodate such factors as the change in gasket compression between clamped and released conditions and normal variations of gasket resilience with usage, age and the like. In addition to such conventional hinge freedom, the present invention provides a further relatively large range of upward closure movement.

In presence of such additional hinge freedom, closure member 162 can respond fully to the forces that act upon it under the particular clamp conditions represented in FIG. 30 and the associated enlarged sections, FIGS. 30A and 30B. In those figures the two clamps 170a next to the handle, which may be called handle clamps, are still fully clamped, but all the other clamps 170b and 170c, which may be called collectively hinge clamps, have been released. The resulting forces on closure 162 comprise mainly the highly localized downward forces of the clamp pair 170a, which coincide as seen in FIG. 30, and the opposing, more widely distributed upward force exerted by the resilient gasket by virtue of its compression. I have discovered that the resultant of those upward forces is in general offset toward the closure hinge from clamps 170a, as indicated schematically by the arrow 176, resulting in a strong torque tending to raise the hinge side of the closure. The present invention utilizes that resultant torque to supplement the force due to any residual pressure for breaking the seal loose in the hinge region. A path 178 is thereby opened for pressure release in the direction away from the operator.

The resulting upward movement of the closure is positively limited by suitable design of the hinge structure, especially the upper termination of slotted holes at 174, producing a wide enough opening to establish pressure equilibrium rapidly but without too great blast force. The best size of opening depends upon such factors as maximum anticipated pressure, size of the pressure vessel, viscosity of the contained fluid, and the like. The indicated opening at 178 in FIG. 30B and the indicated tilt of the closure member in FIG. 30 are somewhat exaggerated for clarity of illustration.

As soon as any residual pressure has escaped at 178, which the operator can readily determine by the sound, handle clamps 170a may be released, typically returning the closure to essentially level position and permitting the operator to swing it open by handle 163.

Whereas the described method of controlling blast direction can be practiced effectively with clamping devices of conventional design, provided suitable freedom of hinge movement is available, it is preferred to provide apparatus associated with the handle clamps for preventing release of those clamps until after all other clamps, that is, all hinge clamps as above defined, have been released. Such apparatus has the advantage of insuring that the operator will release the clamps in the proper order to obtain a safely directed pressure blast. Such selective blocking of the handle clamps against initial release can be accomplished by apparatus of many types. For example, the handle clamps may be provided with latch mechanisms such as those of FIGS. 11 or 12 and 13, with the latch release coupled to the hinge clamps by suitable linkage structures or by flexible shafts, for example.

A preferred manner of selectively blocking release of the handle clamps is to use at the handle positions clamp devices which include the above described property of positively raising the closure member in response to clamp relief. The same mechanism which provides that novel function then acts also to block clamp release whenever the closure is not free to be raised. Illustrative clamps having that property have been described in connection with FIGS. 21 to 25 and FIGS. 26 to 28. For example, if clamps 170a of FIG. 29 are of that type they clearly cannot be released first, since the closure is held fast by the hinge clamps 170b and 170c.

FIG. 1 represents a clamp arrangement of that general type, in which the two clamps 40a next to handle 33 are shown with safety lugs 90a projecting from closure 30 and with safety cams 96a on clamp arms 50, in the manner more fully described in connection with FIGS. 26 to 28. Hence those two clamps cannot be released until the other four clamps 40 have first been released. Those four clamps, on the other hand, are of the simpler form typically shown in FIGS. 3 to 7 without safety cams or any equivalent structure, and can be released or clamped individually without reference to the condition of other clamps. That general form of distinction between the so-called handle clamp or clamps and the hinge clamps is a significant feature of the present aspect of the invention.

The blast control procedure described above in connection with FIGS. 29 and 30 is preferably aided by providing supplementary resilient means tending to lift the closure from its seat at the hinge side. Such resilient means may, for example, comprise any desired number of spring units acting between the closure and neck in the region near the closure hinge. An illustrative spring unit for that purpose is shown in FIG. 31, comprising the U-shaped bracket 180, rigidly mounted on the neck 24 and having aligned bores in its arms in which the plunger 182 is mounted for vertical sliding movement. The coil spring 184 bears on the plunger shoulder 186, urging the upper end of the plunger against a bracket 188 on the closure member. Shoulder 186 may comprise a nut adjustably threaded on the plunger and serving also as limit stop for the plunger movement. Many different types of springs may be used, and the spring mechanism may be incorporated in the hinge, as described below.

The above described procedure for blast control is not limited to closures sealed by resilient gaskets, as illustrated in FIGS. 29 and 30, but is also effective with closures making positive metal-to-metal contact and sealed by O-rings or the like. In the latter case spring action of the general type just described is especially desirable, and is preferably incorporated in the hinge structure. FIGS. 32 and 33 represent a closure of that type with O-ring 191 set in conventional manner in the vessel rim and forming a seal with the closure rim. The fixed hinge bracket 190 is of U-shape and supports the lower ends of the four springs 192. The upper spring ends are seated in pairs on the saddle members 194, which ride on the hinge pivot 196 between the two closure hinge brackets 198. Pivot 196 is thereby urged upward in the slotted holes 191, tending to raise the hinge portion of the cover.

The described procedure for blast control is useful with a wide variety of clamp structures. In particular, that is generally true of the clamps described in my above identified issued patents, wherein clamping action is obtained by shifting an abutment structure longitudinally of the clamp member after the latter has been swung into working angular position. With suitable modification of such structures in accordance with the present invention the closure may be forcibly lifted from its seat by the action of relieving the clamp arm or by clamp arm movement toward idle position.

For example, as typically shown in FIGS. 34 and 35, a previously known clamp structure comprises the pivot shaft 200, journaled in the brackets 202 which are rigidly mounted on the vessel neck 201. The tension member 204 has one end adjustably threaded in a transverse bore in shaft 200 and its other end threaded in the transverse cam arbor 206. Two identical cams 208 are journaled on arbor 206 and are interconnected and jointly operated by the handle 209. Closure member 212 is provided with the two spaced lugs 210 which embrace tension member 204 when in working position and provide follower surfaces 211 for the cams.

The present invention adds to that known structure cam mechanism acting between the tension member assembly and closure member 212. In the present illustrative embodiment two rods 214 are mounted on shaft 200 parallel to tension member 204 and on opposite sides of it. The rod ends act as cams, engaging the lower surfaces of the respective lugs 210, which are inclined downward toward their ends 216. As the clamp assembly is shifted outward from working position, rods 214 are carried with it, and positively cam the closure up from its seat, as shown in FIG. 35, before clamp cams 208 can clear lugs 210.

FIGS. 36 and 37 illustrate a modified cam structure for insuring pressure equalization with a clamp of the same basic type as in FIGS. 34 and 35. An extension 220 at one end of cam arbor 206 acts as cam during swinging movement of the clamp arm assembly. The cam follower 222 is mounted on closure member 212 in elevated position by means of the bracket post 224, projecting from the bracket post in a direction parallel to the cam arbor.

After release of the main clamp cams 208, initial swinging movement of tension member 204 toward idle position causes the upper rounded portion of arbor extension 220 to engage follower 222, lifting the closure in a positive manner as shown in FIG. 37. Pressure equalization is thereby insured before the closure can be fully released.

When the clamp structures adjacent the handle of a hinged closure provide the functions described for either of the clamps of FIGS. 34, 35 or 36, 37, the handle clamp cannot be fully released until all other clamps have been released. Under that condition the operator is found to develop the habit of leaving the handle clamp fully engaged until after the others have been released. The system then acts essentially as described in connection with FIGS. 29 and 30, directing the blast from any residual pressure in a safe direction away from the operator.

When the hinge components are not of precision fit the closure may have enough side play to become seriously decentered with respect to the sealing gasket. This may cause leakage, or require the operator to center the cover manually before securing the clamps. A further aspect of the present invention provides automatic centering mechanism, which preferably incorporates additional safety features.

As illustratively shown in FIG. 38, the handle formation 231 is formed on a unitary casting 230 which projects radially from the closure rim 232 directly opposite the hinge, not explicitly shown. Casting 230 includes the downward projection 234, which is bifurcated to form the radial slot 236. The slot side walls are typically parallel at the slot base and diverge smoothly to form a widely flaring, downwardly opening mouth. To cooperate with slot 236, the plate 240 is rigidly mounted on the aperture neck 241 with the upper plate edge portion forming a radially extending blade 242. As the closure member approaches its seat, fixed blade 242 is received in flaring slot 236, forcibly and accurately centering the closure on its seat. A depending gusset or skirt, not shown, may be secured to the casting to protect the hands of the operator.

As a further safety measure, aligned transverse holes 244 are preferably provided in plate 240 and in the two portions of projection 234, through which the lock pin 246 may be inserted. The pin may be retained by a padlock if desired, or by quickly releasable retaining means such as indicated at 247. Holes 244 are vertically slotted to a predetermined extent to permit limited closure movement. Pin 246 is preferably inserted whenever the closure is closed and clamped, and is left in place until unclamping of the closure has been completed. If any pressure should still remain in the chamber, the closure then can rise only to the extent permitted by the slotted holes 244 on the handle side and by the hinge structure on the opposite side. After the operator is satisfied that no pressure remains, the safety lock is removed and the cover may be opened.

A wide variety of modifications may be made in the particular structures that have been illustrated and described without departing from the essence of the invention. The following are intended to be merely illustrative and not limitative of such changes.

It is sometimes desirable to form the shank of handle arm 60 of two sections coupled by a hinge, at which the arm can be folded when not in use; or the hub end of the handle arm may be formed with a socket in which the shank is removably secured.

The shank portion of the clamp arm may comprise a rod or bolt rigidly connecting suitable end formations. Or the clamp arm may comprise an eye-bolt with the eye pivotally mounted on handle boss 62 and with a suitable casting threaded on the free end of the eye-bolt to take the place of hook formation 54. The threaded connection then provides a convenient coarse adjustment of the effective length of the clamp arm.

With reference to the formation at the end of the clamp arm, any term such as "hook" is intended to embrace any structure by which a closure sealing force can be applied from the clamp arm to the closure itself. That is, the word "hook" is intended to be suggestive only of the function rather than of the physical form. In particular, such formation may comprise, for example, two arms projecting oppositely from the clamp arm and engaging respective parallel projections on the closure.

The safety cams and cam followers, such as 96 or 96a and 90, for example, have been pictured for clarity as projecting from the members on which they are carried. In practice, they may be more closely integrated with those members, even to the point of comprising certain surface areas of the members themselves. It will also be evident, for example from FIG. 1, that safety cam follower 96a of the right-hand clamp 90a may conveniently be integrated with closure handle 33; and that the same may be done for the left-hand clamp 90a by interchanging the axial positions of the clamp arm and handle arm.

I claim:

1. In combination with a chamber having an aperture surrounded by a seat, a closure member for the aperture, a plurality of clamping devices angularly spaced about the aperture periphery and actuable selectively to clamp and to release the closure member, and hinge means at one side of the closure member pivotally connecting the closure member and the chamber; the improvement comprising means associated with the hinge means for allowing limited translational movement of the closure member away from the seat to equalize pressure in the chamber, and means associated with at least one of said clamping devices approximately opposite the hinge means for obstructing release of that one clamping device until all clamping devices nearer the hinge means have been released.

2. Improvement according to claim 1 wherein said obstructing means comprise
   abutment means coupled to said one clamping device for positively separating the closure member from the seat in response to releasing operation of said one clamping device.

3. Improvement according to claim 1 including
   resilient means yieldably urging said limited translational movement of the closure member.

4. Improvement according to claim 3 wherein said resilient means includes spring means associated with the hinge means and acting between the closure member and the chamber.

5. Improvement according to claim 3 wherein said resilient means includes a resilient sealing gasket between the closure member and the seat.

6. Improvement according to claim 5 wherein the resilience of the gasket is sufficient, under clamping condition of said one clamping device and released condition of all clamping devices nearer the hinge means, to lift the closure member from the seal adjacent the hinge means.

7. Improvement according to claim 1 wherein said hinge means include hinge pin means on one of said chamber and closure member, and said movement allowing means comprise an elongated pin receiving aperture on the other of said chamber and closure member,
   the aperture elongation extending perpendicular to said seat through a first range which corresponds to normal seat variations and also through a further range for said pressure equalization.

8. Improvement according to claim 1 wherein said closure member includes a handle at the side opposite to said hinge means, and said improvement includes release obstructing means associated with each of the clamping devices which are oppositely adjacent the handle.

9. In combination with a chamber member having an aperture surrounded by a seat, and a closure member for engaging the seat to seal the aperture, a plurality of clamping devices angularly spaced about the aperture periphery and actuable selctively to clamp and to release the closure member;
   pressure equalizing means coupled to at least one of said clamping devices for positively separating the closure member from the seat in response to releasing actuation of said one clamping device.

10. Combination according to claim 9 wherein said one clamping device comprises
    a clamp arm,
    means pivotally mounting the clamp arm on one of said members for swinging movement between an idle position clear of the other member and a working position permitting only limited separation of the closure member from the seat,
    and clamp actuating means operable, in said working position of the clamp arm, for selectively clamping the closure member to the seat and releasing the closure member for only limited separation from the seat.

11. Combination according to claim 10 wherein said pressure equalizing means comprises abutment means coupled to said clamp actuating means for positively engaging structure fixedly mounted on said other member in response to releasing operation of said clamp actuating means.

12. Combination according to claim 10 wherein said pressure equalizing means comprises abutment means coupled to said clamp arm for positively engaging structure fixedly mounted on said other member in response to swinging movement of the clamp arm toward idle position.

13. Combination according to claim 10 wherein said clamp arm mounting means comprise
   a cylindrical hub having the clamp arm journaled on its cylindrical surface,
   and means pivotally mounting the hub with respect to said one member on a pivot axis parallel to the cylindrical axis of the hub and eccentrically offset therefrom,
and said clamp actuating means comprise
   driving means for rotating the hub selectively in clamping and clamp relieving directions.

14. Combination according to claim 13 wherein said pressure equalizing means comprise
   cam means coupled to said driving means,
   and cam follower means mounted on said other member for cooperation with the cam means in response to movement of the driving means in clamp relieving direction.

15. Combination according to claim 13 wherein said pressure equalizing means comprise
   cam means mounted on said clamp arm,
   and cam follower means mounted on said other member for cooperation with the cam means in response to said hub rotation in clamp relieving direction.

16. Combination according to claim 13 wherein said pressure equalizing means comprise
   cam means mounted on said clamp arm,
   and cam follower means mounted on said other member for cooperation with the cam means in response to swinging movement of the clamp arm toward idle position.

17. Combination according to claim 10 wherein said slamp arm mounting means comprise
   means pivotally mounting the clamp arm on a pivot axis fixed relative to said one member, and said clamp actuating means comprise
   contact structure mounted on the clamp arm for relative longitudinal movement and adapted, in said working position of the clamp arm, to engage and clamp other said member in response to movement in one direction and to relieve said other member in response to movement in the other direction,
   and driving means for moving said contact structure selectively in said clamping and relieving directions.

18. Combination according to claim 17 wherein said pressure equalizing means comprise
   cam follower means on said other member,
   and cam means on the clamp arm for cooperating with the cam follower means to positively separate the closure member from the seat in response to operation of said driving means in clamp relieving direction.

19. Combination according to claim 17 wherein said pressure equalizing means comprise
   cam follower means on said other member,
   and cam means on the clamp arm for cooperating with the cam follower means to positively separate the closure member from the seat in response to swinging movement of the clamp arm toward idle position.

20. Clamping apparatus for a chamber member having an aperture surrounded by a seat that is engageable by a closure member to seal the aperture, with a plurality of clamping devices for the closure member; at least one of said clamping devices comprising
   a hub member including a cylindrical hub having a through bore on a pivot axis parallel to the axis of the hub and eccentrically offset therefrom,
   means on one of said chamber and closure members for pivotally supporting the hub member on said pivot axis for controllable rotation between a closure clamping position and a closure relieving position,
   a clamp arm journaled adjacent one end on said cylindrical hub and swingable about the hub axis between an idle position and a working position,
   said clamp arm carrying at its other end rigidly mounted hook structure in position to be free of the other of said chamber and closure members in idle angular position of the clamp arm, and to be engageable with said other member in working angular position of the clamp arm,
   said eccentric offset being such that, in working position of the clamp arm, the hook structure clamps the closure member to the seat in clamping position of the hub, and permits positively limited closure movement away from the seat in relieving position of the hub.

21. Clamping apparatus according to claim 20 wherein said hub member comprises a boss formed on a handle arm extending generally radially from the hub and swingable manually about said pivot axis to shift the hub between said clamping and relieving positions.

22. Clamping apparatus according to claim 21 wherein the direction of handle arm movement is such that any friction between said clamp arm and said hub tends to retain the clamp arm in working angular position as the handle arm swings from clamping to relieving position.

23. Clamping apparatus according to claim 21 wherein the direction of handle arm movement away from clamping position is opposite to the direction of clamp arm movement away from working position, and said combination includes means for releasably latching the handle arm and the clamp arm against relative movement away from said respective positions.

24. Clamping apparatus according to claim 21 wherein said hub member supporting means comprise
   plate structures fixedly mounted on said other member in mutually spaced parallel relation with aligned plate bores,
   and a pivot shaft removably insertable in the hub bore and the two plate bores to pivotally support the hub member between the plates,
   the handle arm and the clamp arm having respective axial thicknesses which substantially fill the space between the plates.

25. Clamping apparatus according to claim 20 wherein said hub member supporting means comprise
   a shaft journaled on said one member and received in said through bore,
   means rotatively coupling the shaft and the hub member,
   and means coupled to the shaft externally of the clamping device for driving the shaft to shift the hub member between said clamping and relieving positions.

26. Clamping apparatus according to claim 25 wherein said shaft is journaled on two plate structures which are fixedly mounted on said other member in mutually spaced parallel relation with said hub member receivable between them, the hub and the clamp arm having respective axial dimensions each of which substantially fills the space between the plates.

27. Clamping apparatus according to claim 25, wherein said shaft is coupled to the hub members of a series of axially aligned clamping devices for simultaneous operation to selectively clamp and release a single closure member.

28. Clamping apparatus according to claim 20 wherein said aperture opens downwardly from a tank member, and said combination includes hinge means for coupling the closure and the tank member at one side of the aperture.

29. The combination of clamping apparatus according to claim 28 and airslide means at said aperture with air inlet means below the air slide means for discharge of fluidized granular material from the tank member.

30. Clamping apparatus according to claim 20 wherein said seat faces outwardly and said hub member supporting means of each clamping device is positioned within the chamber member inwardly of the closure member for normal operation from inside the chamber.

31. The combination of clamping apparatus according to claim 30 including
a handle arm coupled to each hub member,
coupling means adjacent the free end of each handle arm,
and at least one aperture in the closure member normally sealed by means removable from outside the chamber,
the handle arms being positioned, when in closure clamping position, with said coupling structure accessible by a tool inserted through the closure member for swinging the handle arms to release the clamping device.

32. Combination according to claim 20 or 31 including means for yieldingly urging each clamp arm toward said idle position.

33. Clamping apparatus according to claim 20 wherein said through bore on the handle axis has the form of a channel opening radially outwardly through the cylindrical surface of said hub,
and said hub member supporting means includes a pivot pin retained in the channel by tangential contact with the convex journal surface of said clamp arm.

34. Clamping apparatus according to claim 20 wherein
said hook structure of the clamp arm is engageable with a surface on said other member which is inclined radially inwardly relative to the arcuate path of hook movement due to swinging of the clamp arm about said pivot axis toward said working position,
and said apparatus includes adjustable stop means for variably terminating such swinging movement to adjust the tightness of clamping of the closure member to the seat.

35. Clamp structure adapted for mounting between fixedly supported spaced parallel mounting plates and comprising
handle arm means having adjacent one end two oppositely facing parallel surfaces with mutually aligned cylindrical bosses projecting from the respective surfaces, with a through bore parallel to the common axis of the bosses and eccentrically offset from that axis by a distance such that the bore is within, or internally tangent to, the cylindrical boss surfaces,
clamp arm means journaled adjacent one end on said bosses and carrying at the other end rigidly mounted hook means,
one of said arm means comprising two portions which are approximate mirror images of each other with the other arm means rotatably received between them, the resulting assembly having an axial dimension adjacent said bore to fit between said mounting plates,
and a pivot pin insertable through said bore and through aligned holes in the mounting plates.

36. Clamp structure according to claim 35 wherein the two portions of said one arm means have mutually engageable mating surfaces with means for releasably joining the portions at the mating surfaces to form a rigid unit.

37. Clamp structure according to claim 35 or 36 wherein said handle arm means comprises two members with said oppositely facing surfaces facing each other with aligned bosses projecting toward each other in substantially abutting relation and forming an effectively unitary journal bearing for said clamp arm means.

38. Clamp structure according to claim 35 or 36 wherein said clamp arm means comprises two members which are journaled on respective bosses that project oppositely from opposite faces of said handle arm means.

39. In combination with a chamber having an aperture surrounded by a seat, a closure member mounted by hinge means at one side of the aperture, and clamping means for releasably securing the closure member in sealing relation to the seat; improved handle means for swinging the closure member from the seat after release of the clamping means, comprising
bracket means extending generally radially from the closure member opposite the hinge means and carrying a hand hold,
a recess in the bracket means having a flaring mouth facing toward the chamber,
and a fixture rigidly mounted on the chamber in position to be received in the recess as the closure member approaches the seat, and thereby to center the closure member with respect to the seat.

40. Handle means according to claim 39 including aligned holes in the fixture and in the bracket means generally parallel to the seat for receiving a lock pin when the closure member is clamped to the seat.

41. Method of insuring safe release of residual pressure from a pressure vessel before opening a manway that is normally sealed by a cover clamped to a peripheral seat by a plurality of angularly spaced clamping devices; said method comprising
hinging the cover to the vessel at one side by hinge means which permit limited translational cover movement away from the seat,
providing means associated with at least one clamping device approximately opposite the hinge means for blocking release of that clamping device until all other clamping devices are released,
releasing first said other clamping devices, to cause any residual pressure to lift said one side of the cover the limited distance permitted by the hinge means and thereby to equalize pressure in the vessel.
then releasing said at least one clamping device and swinging the cover open about the hinge means.

* * * * *